Feb. 17, 1970   W. LOBUR   3,496,321
ELECTRICAL DISCHARGE MACHINING APPARATUS
FOR MULTIPLE ELECTRODES
Filed July 15, 1966

INVENTOR.
Walter Lobur
BY
Harry R Dumont
ATTORNEY.

United States Patent Office 3,496,321
Patented Feb. 17, 1970

3,496,321
ELECTRICAL DISCHARGE MACHINING APPARATUS FOR MULTIPLE ELECTRODES
Walter Lobur, Clawson, Mich., assignor to Elox Corporation, Troy, Mich., a corporation of Michigan
Filed July 15, 1966, Ser. No. 565,510
Int. Cl. B23p 1/08
U.S. Cl. 219—69
5 Claims

ABSTRACT OF THE DISCLOSURE

A control circuit for multiple-electrode electrical discharge machining apparatus having a common source for providing pulses of variable on-time (and thus average-current) characteristics simultaneously to a plurality of work gaps in parallel. Each gap has a diode and a like-value resistor in series therewith. The pulses and their durations are produced and controlled by a single electronic switch triggered off by sensing circuits responsive to open-circuit condition of one or more of the gaps, whereby the on-time and thus average current is reduced proportionally to the number of gaps not firing in order to protect from over-energization those gaps in firing condition.

Figure 1:
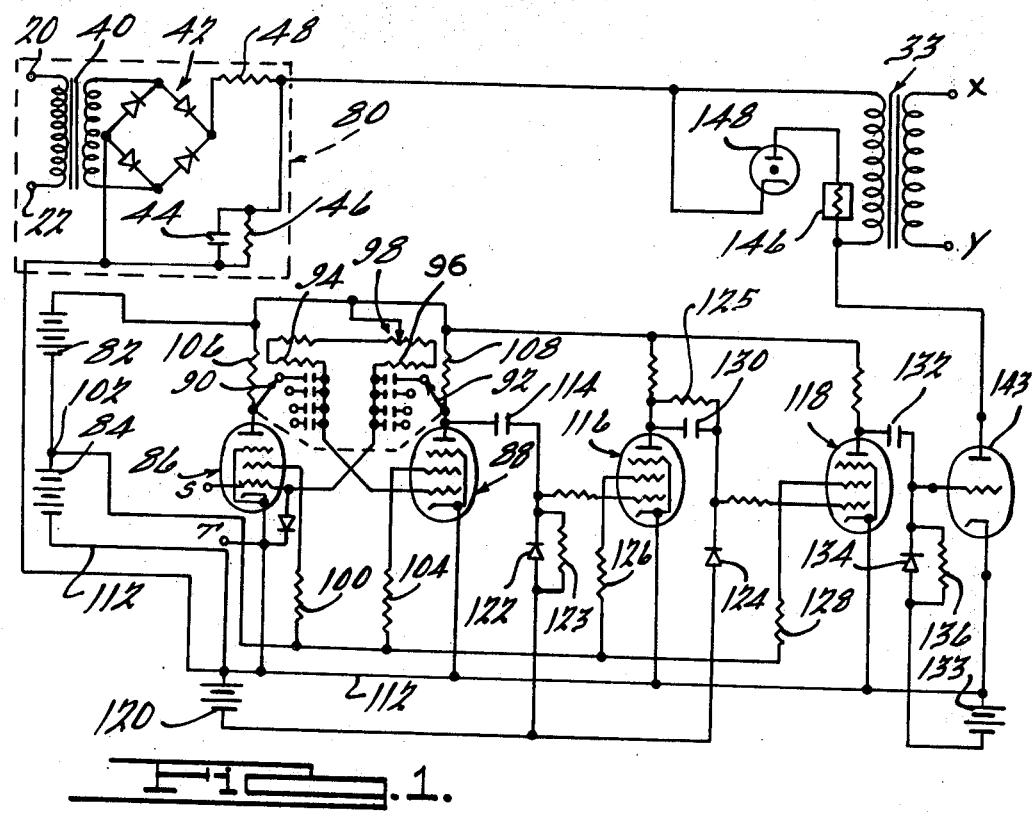

In electrical discharge machining, electrical machining power pulses are passed across the gap between a tool electrode and a conductive workpiece through a dielectric fluid medium to provide workpiece material removal at a precisely controlled rate and within relatively close tolerance limits. The dielectric fluid utilized is a self restoring, ionizable fluid such as kerosene, transformer oil and the like. A suitable servo feed means is provided to maintain optimum gap spacing between electrode and workpiece as machining progresses and workpiece material is removed.

In some machining operations, it is desirable to use a plurality of electrodes to machine one or more workpieces with the cutting operation on the several electrodes being performed at the same time from a common power supply. When the machining operation has started, it is not possible to achieve immediate machining on all electrodes. This arises from the difficulty of making a precise mechanical alignment and spacing of all electrodes relative to the workpiece. It is also true that the electrical characteristics of the gaps as they exist between the several electrodes and the workpiece are not uniform. It is therefore desirable to provide a current control as between the several electrodes and the output of the power supply so that current will be suitably reduced until stable cutting conditions exist on all of the several electrodes. This current control is further necessary to prevent the passage of excessive current through the first electrode or group of electrodes to commence cutting which might tend to promote DC arcing or short circuiting of the gap.

SUMMARY OF THE INVENTION

My invention relates to provision of a circuit for reducing the machining current of the machining pulses furnished to the gap until a stable cutting condition has been established for all the electrodes. This reduced current is provided by narrowing the on-time of the machining pulses to a degree which is proportional and related to the number of electrodes on which a cutting condition has been established. Otherwise stated, the machining pulse on-time is reduced so long as open circuit condition exists at any of the several machining gaps. Excess current damage is prevented to the first cutting electrode until the other electrodes commence cutting.

My invention is of particular importance in electrical discharge machining operations with graphite electrodes in which machining is conducted with relatively long on-time pulses having a duty factor of the order of 90% or more. Under these conditions, it is possible to maintain a substantial "no-wear" condition of the electrodes relative to the workpiece. By narrowing the pulse on-time in accordance with the teaching of my invention, this wear ratio is caused to be significantly altered so that those electrodes first cutting are somewhat more rapidly reduced in size to tend to equalize the gap spacings between electrodes and the workpiece and to thus stabilize the cutting on all electrodes.

Accordingly, it is an object of my invention to provide an improved electrical discharge machining apparatus for use with multiple electrodes in which there is a circuit provided for current reduction of the machining power pulses which reduction is a function of the number of electrodes on which cutting has commenced.

It is a further object of my invention to provide an improved electrical discharge machining power supply particularly adapted for multiple electrode operation in which the machining pulses furnished are of variable on-off time and in which the pulse on-time is proportionately reduced until stable cutting is achieved on all electrodes.

It is a still further object of my invention to provide an improved method of electrical discharge machining with multiple electrodes which includes reducing the gap machining current responsive to open circuit condition of at least one of the electrodes and restoring the gap machining current to successively higher magnitudes responsive to commencement of cutting operation on additional electrodes.

Figure 2:
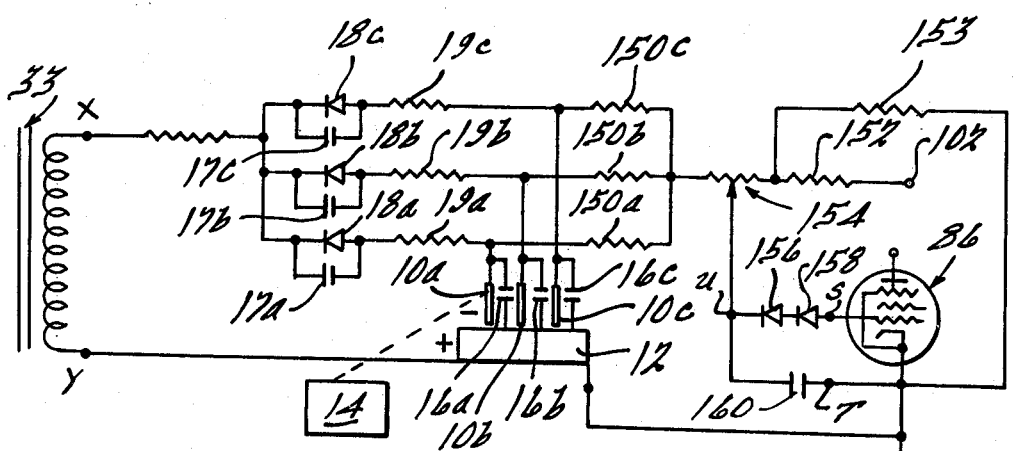

The unique features, additional objects, and advantages of the present invention and the manner in which these may be achieved will be more clearly understood by reference to the following description of the invention when taken in conjunction with the accompanying drawings, in which:

FIGURE 1 is a schematic drawing showing a pulse generator of the multivibrator type in which an electronic switch is triggered at selectively variable frequencies and on-off time to provide a substantially rectangular pulse output to a transformer output stage, and FIGURE 2 is a schematic drawing showing the gap output and current control circuit for the circuit of FIGURE 1 specially designated for multiple electrode operation in accordance with the teachings of my invention.

With more particular reference to the circuit of FIGURE 1, it will be seen that the pulse generator includes an electronic switch or bank of electronic switches having their principal electrodes connected in series with the primary winding of a gap transformer 33 and the main power supply 80. Electronic switch 143 is preferably of the vacuum tube type in which turn-on is accomplished by a control voltage to the control electrode or grid of the switch and in which turn-off is accomplished in response to the removal of the control voltage. Provision is made for furnishing the pulses to the machining gap by connecting the secondary winding of transformer 33 to the machining gap with the terminals X and Y similarly marked to indicate their connection in the circuit of FIGURE 2, hereinafter.

Main power supply 80 employed includes a transformer 40 having its primary connected across AC time terminals 20, 22 and having its secondary connected to bridge rectifier 42. Connected across the power DC output of bridge rectifier 42 is filter capacitor 44 of the electrolytic type which capacitor is paralleled by resistor 46 and connected in series with a limiting resistor 48.

The pulsing means for tube 143 is an electronic multivibrator of the astable operating type. Voltage supplies 82 and 84 may be for example of the order of several hundred volts sufficient to provide the necessary operating voltages for the multivibrator and subsequent amplifiers which are required. To simplify the circuits, all power supplies with the exception of power supply 80 are shown as DC sources. In practice, these power supplies employ AC inputs, with rectifiers and filter capacitors after the manner indicated for power source 80.

The multivibrator used includes pentode type tubes 86 and 88 having their plates and control grids cross connected through RC coupling networks for operating in the astable mode. The coupling networks include ganged capacitor switches 90 and 92, resistors 94 and 96, and the variable resistance of potentiometer 98. It will be seen that, by the adjustment of the potentiometer 98, an increase or decrease in resistance will serve to selectively vary the multivibrator on-time. The phasing of the multivibrator is such that when tube 86 is "on" the machining gap is being furnished with a machining power pulse. When tube 88 is in its conducting state, the gap is turned off. The screen grids of tubes 86 and 88 are connected to screen voltage tap 102 through limiting resistors 100 and 104, respectively. The plates of tubes 86 and 88 are connected to the positive terminal of voltage supply 82 through load resistors 106 and 108. The cathodes of tubes 86 and 88 are connected to the negative terminal of power supply 84 through lead 112.

The output of multivibrator tube 88 is fed through coupling capacitor 114 into following amplifier stages which comprise, in the present instance, pentode tubes 116 and 118. The output signals of the several stages are clamped to negative bias voltage 120 by diodes 122 and 124 as shown. Shunt resistor 123 returns the grid of tube 116 to bias source 120 in the absence of drive signal. Resistor 125 parallels condenser 130 to return the grid of tube 118 to a positive voltage to maintain proper phase in the absence of drive signal. The screen grids of tubes 116 and 118 are connected to the positive terminal of voltage supply 84 through resistors 126 and 128, respectively. The amplified signal output from tubes 116 and 118 pass through coupling capacitors 130 and 132 as indicated. Tube 143 has its cathode connected to the negative terminal of main power supply 80 and its plate connected to the positive terminal of power supply 80 through the primary winding of transformer 33. A parallel protective network for the primary of transformer 33 includes serially connected thyrite cell 146 and damping diode 148. Tube 143 further has its grid bias furnished by bias voltage supply 133 with diode 134 and resistor 136 connected as shown.

It is the function of the circuit of FIGURE 1 to provide a pulse output to transformer 33 with the frequency preset according to the multivibrator setting determined by the capacitor switches 90, 92. The current content of the pulses furnished is variable by means of the adjustment of multivibrator on-off time.

With more particular reference to FIGURE 2, it will be seen that the output stage of the power supply to the gap is shown. The terminals X and Y indicate the transformer output terminals from the pulse generator as has been shown and described in the circuit of FIGURE 1. A plurality of electrodes, in the present instance three, are indicated by the numbers 10a, b, and c. In multiple electrode machining operations, as many as 10 or more electrodes may be employed to machine a single workpiece. In other cases, a plurality of electrodes may be simultaneously employed with a single machining power source to machine a plurality of different workpieces with the gap elements all connected to respective terminals of the common power source. The workpiece is indicated by the numeral 12. Also shown in block diagram form is a servo feed system 14 which is employed to provide relative advance of the electrodes 10a–c toward the workpiece 12 during machining as is well known in the art. The servo feed system 14 may be of the electrically or electrohydraulically operated type. One type of servo feed system suitable for use in conjunction with my invention is the one shown and described in FIGURE 4 of U.S. Patent Re. 25,242, issued on Mar. 24, 1964, to Robert S. Webb and entitled "Power Feed System." A plurality of gap capacitors are included in the circuit as indicated by the numerals 16a, 16b, and 16c, each capacitor being connected in parallel with a different electrode gap. Also included in the circuit is a series network connected to a common terminal of transformer 33 for each of the electrodes employed. It will be seen that the network includes a series diode 18a, 18b, 18c, each connected to electrode 10a, 10b, 10c respectively. A current limiting resistor 19a, 19b, and 19c is connected in each of the respective networks so that the total current output is of the order of rated current for the power supply. Each of the diodes is paralleled by its voltage spike protective capacitor 17a, 17b, and 17c. A voltage divider sensing network is also included in the circuit with a different resistor 150a, 150b, and 150c connected to each of the electrodes. A source of positive reference voltage indicated by point 102 is coupled to the right hand terminal of the voltage divider network with a series resistor 152 and a potentiometer 154 connected as shown. Resistor 153 is connected as indicated to maintain a constant reference voltage. The voltage output of the network is connected to terminals S and T as indicated in the circuit of FIGURE 1 with showing being made of a portion of the multivibrator which comprises tube 86. A pair of diodes 156, 158 and capacitor 160 are included as shown with capacitor 160 functioning as a bypass capacitor.

DESCRIPTION OF OPERATION

When the machining operation is initiated, machining pulses are provided through the multivibrator and its associated amplifier stages by the periodic operation of tube 143. Each time tube 143 is rendered conductive, an output pulse is provided through transformer 33 to each of the several electrode gaps. Downfeed is initiated by servo feed system 14 and cutting will normally commence on fewer than all of the electrodes for reasons hereinbefore given. The on-time of the multivibrator and the gap has been preset according to potentiometer 98 to provide a train of relatively constant on-time current pulses to the gap. When point S which controls the voltage on the grid of tube 86 is positive with respect to its cathode, multivibrator operation will be normal with respect to pulse on-time. If cutting has commenced, for example, with electrode 10a but not with electrodes 10b and 10c there will be a voltage drop through resistors 150c and 150b which will lower point U to a negative level which will serve to reduce the pulse on-time as controlled by the grid of tube 86. Otherwise stated, the output of the voltage divider network is a control voltage which will reduce the on-time of the multivibrator by a percentage which may be preset by potentiometer 154. Current reduction thus protects the leading or first cutting electrode 10a. In the case of graphite electrodes, the narrowing of pulse on-time serves to substantially alter the wear ratio as between electrode 10a and the workpiece 12 so that increased electrode material removal results from the electrode first cutting. This tends to equalize the spacing of the several gaps so that, in response to normal servo feed operation, stable cutting will begin on electrodes 10b and 10c. As electrodes 10b and 10c change from a gap open circuit condition to a cutting condition, the voltage output from the voltage divider network will be reduced with the effect on the grid of tube 86 of increasing the pulse on-time and, hence, restoring the magnitude of the current pulses furnished to the gap. In this manner, as each additional electrodes commence cutting, machining pulse current is properly restored to the gap. The values of the voltage divider network and of potentiometer 154 can be adjusted in accordance with the number of electrodes employed and the desired current reduction which is a function of the number of electrodes cutting.

It will thus be seen that I have provided by my invention an improved apparatus and method for electrical discharge machining with multiple electrodes operating from a common power supply.

I claim:

1. In an electrical discharge machining apparatus for machining a conductive workpiece by tool electrodes across a dielectric coolant filled gap, a power supply, a periodically operated electronic switch, a pulser for operating said switch, a transformer having a primary winding and a secondary winding, said electronic switch operatively connected between said supply and said primary winding for providing pulses thereto, a plurality of electrodes, each connected to a common terminal of said secondary winding in series with a different diode, a voltage divider, said divider having a different, like-value resistor in series between each of said electrodes and a reference voltage, said pulser operatively connected between the output of said divider and said electronic switch for reducing the on-time of its pulse output responsive to open circuit condition of at least one of said electrodes.

2. In an electrical discharge machining apparatus for machining a conductive workpiece by tool electrodes across a dielectric coolant filled gap, a machining pulse source for providing pulses of variable on-time characteristics, a plurality of electrodes, each connected to the output of said source in series with a different diode, a voltage divider, said divider having a different, like-value resistor in series between each of said electrodes and a reference voltage, and an electronic switch operatively connected between the output of said divider and said source for reducing the on-time of its pulse output responsive to gap open circuit condition of at least one of electrodes.

3. In an electrical discharge machining apparatus for machining a conductive workpiece by tool electrodes across a dielectric coolant filled gap, a power supply, a periodically operated electronic switch of variable on-time and a transformer, said transformer having a primary and a secondary winding, said electronic switch operatively connected between said supply and said transformer primary for furnishing pulses thereto, a plurality of electrodes, each connected to said secondary winding through a different, like-poled unidirectional current conducting device, a voltage divider network responsive to the cutting condition of said electrodes in the gap, said network connected between said electrodes and a reference voltage and operable to produce a control voltage output which is a function of the proportion of said electrodes cutting, and an electronic switch operatively connected between said control voltage output and said first-mentioned electronic switch for reducing its on-time.

4. The method of electrically machining a conductive workpiece by a plurality of tool electrodes across a dielectric coolant filled gap, comprising the steps of providing variable on-time machining pulses of a predetermined time duration to each of said electrodes from a common pulse source, sensing gap condition between said electrodes and said workpiece, reducing the on-time of said pulses responsive to open circuit condition of at least one of said electrodes, and restoring the on-time of said pulses to successively greater time durations responsive to cutting condition of additional electrodes.

5. In an electrical discharge machining apparatus for machining a conductive workpiece by tool electrodes across a dielectric coolant filled gap, a multivibrator controlled, variable on-off time machining pulse source, a plurality of electrodes, each connected to the output of said source and having a different diode in series between it and said source, a voltage divider, said divider having a different, like value resistor in series between each of said electrodes and a reference voltage, said multivibrator including an electronic switch having a pair of principal electrodes and a control electrode, said control electrode connected to the voltage output of said divider, and at least one of said principal electrodes operatively connected to and controlling the on-time of said source for reducing said on-time responsive to gap open circuit of one of said electrodes.

References Cited

UNITED STATES PATENTS

| | | |
|---|---|---|
| 2,783,411 | 2/1957 | Matulaitis. |
| 3,213,257 | 10/1965 | Ferguson. |
| 3,277,337 | 10/1966 | Webb. |
| 3,287,537 | 11/1966 | Chenel et al. |

JOSEPH V. TRUHE, Primary Examiner

R. F. STAUBLY, Assistant Examiner